US009121317B2

(12) United States Patent
Katoshevski et al.

(10) Patent No.: US 9,121,317 B2
(45) Date of Patent: Sep. 1, 2015

(54) EXHAUST GEOMETRY FOR PARTICLE GROUPING

(75) Inventors: David Katoshevski, Omer (IL); Michal Ruzal, Givaataim (IL); Eran Sher, Beer-Sheva (IL)

(73) Assignee: PEMRED AG, Winkel (CH)

( * ) Notice: Subject to any disclaimer, the term of this patent is extended or adjusted under 35 U.S.C. 154(b) by 0 days.

(21) Appl. No.: 13/256,191

(22) PCT Filed: Mar. 28, 2010

(86) PCT No.: PCT/IL2010/000269

§ 371 (c)(1), (2), (4) Date: Nov. 14, 2011

(87) PCT Pub. No.: WO2010/113156

PCT Pub. Date: Oct. 7, 2010

(65) Prior Publication Data

US 2012/0090306 A1 Apr. 19, 2012

Related U.S. Application Data

(60) Provisional application No. 61/164,477, filed on Mar. 30, 2009.

(51) Int. Cl.

| | |
|---|---|
| ***F01N 1/00*** | (2006.01) |
| ***F01N 3/037*** | (2006.01) |
| ***B01D 51/06*** | (2006.01) |
| ***F01N 3/021*** | (2006.01) |
| ***F01N 3/033*** | (2006.01) |

(52) U.S. Cl.

CPC ................ *F01N 3/037* (2013.01); *B01D 51/06* (2013.01); *F01N 3/021* (2013.01); *F01N 3/033* (2013.01); *B01D 2258/012* (2013.01); *Y02T 10/20* (2013.01)

(58) Field of Classification Search

CPC .. B01D 51/06; B01D 2258/012; F01N 3/033; F01N 3/037; F01N 3/021; Y02T 10/20

USPC .................. 60/322, 297, 274, 275, 311, 324; 96/389; 95/29, 62, 272, 267; 55/434, 55/385.3, 461, 468, 90, 94, 242, 257, 446, 55/465

See application file for complete search history.

(56) References Cited

U.S. PATENT DOCUMENTS

| | | | | |
|---|---|---|---|---|
| 3,957,465 | A * | 5/1976 | Pircon | 95/221 |
| 4,376,637 | A * | 3/1983 | Yang | 95/74 |
| 6,447,574 | B1 * | 9/2002 | Frier et al. | 95/29 |
| 6,589,314 | B1 * | 7/2003 | Page et al. | 95/32 |
| 2007/0227128 | A1 * | 10/2007 | Khair et al. | 60/297 |

FOREIGN PATENT DOCUMENTS

| | | | |
|---|---|---|---|
| EP | 1 072 765 | A2 | 1/2001 |
| WO | WO 2007/101246 | A2 | 9/2007 |

* cited by examiner

*Primary Examiner* — Thomas Denion
*Assistant Examiner* — Kelsey Stanek
(74) *Attorney, Agent, or Firm* — Arent Fox LLP

(57) ABSTRACT

An exhaust pipe (100) for a fuel burning engine including a hollow body, the body having an internal surface (120), an external surface (110), a first open end (130), a second open end (140) and a longitudinal axis, wherein the internal surface (120) is shaped to form standing cyclic wave geometry having at least 2 cycles (c). When gas containing inhalable particles (22) enters the exhaust pipe (100) through the first open end (130) and flows out of the exhaust pipe (100) through the second open end (140), a substantial amount of inhalable particles (22) are grouped to form filterable particles (182).

22 Claims, 15 Drawing Sheets

EXHAUST GEOMETRY FOR PARTICLE GROUPING

RELATED APPLICATION

The present application claims the benefit of U.S. provisional application 61/164,477 filed on Mar. 30, 2009.

FIELD OF THE INVENTION

The present invention relates to clustering of small particles and more particularly to grouping of submicron particles in a pipe having a standing wave like geometry.

BACKGROUND AND PRIOR ART

There is a major health and environmental concern regarding emitted particles from vehicle exhaust pipes, in particularly from Diesel engines. Particles, having a size ranging from nanometers to micrometers (herein after referred to as “submicron particles”), impose risk to the health and to the environment. Since the submicron particles are small in size, it is easier for the submicron particles to penetrate the respiratory system. Furthermore, the stay time of smaller size particles in the air is much longer. For example, a particle of 0.1 micron will stay about 100 times longer in the air than a particle of 1 micron. Hence, submicron particles impose a two-fold risk: (a) longer exposure and (b) easier penetration to the lungs. This risk is described in numerous academic papers as well as in the US-EPA website. Emitted particles also harm vegetation and even the surface of buildings and monuments. The term “inhaleable particles” is used herein interchangeably with the term “submicron particles”.

Hence, increasing a particle’s size at the expense of reducing the number of submicron particles will reduce the above mentioned risk impose by submicron particles to the health and environment. The term “filterable particles” as used herein refer to particles large enough such that inhaling organisms of living subjects in general, and those of human beings in particular, are capable of filtering the filterable particles, thereby preventing filterable particles from entering the lungs. Filterable particles also correspond to particles which can be captured by a mechanical filter.

The grouping of submicron particles brings to coagulation and to the formation of larger size particles and thereby decrease the number of submicron particles. There is therefore a need and it would be advantageous to have an apparatus that groups submicron particles into larger size particles, preferably filterable particles, and thereby decrease the number of submicron particles, for example, submicron particles departing from the exhaust system of an engine such as a Diesel engine.

A mathematical analysis concerning the grouping of submicron particles, is found in D. Katoshevski, “Characteristics of Spray Grouping/Non-Grouping Behavior”, Aerosol and Air Quality Research, Vol. 6 (1), pp. 54-66, 2006. The analysis shows that when the velocity of the matter carrying the submicron particles, such as air, has a form of a moving wave, particles that are carried by such a wave may form groups under specific range of parameters. Such a wave exists in various systems such as in the case of particles in the seawater where the wave is moving, described in Winter, C. at al, “Grouping Dynamics of Suspended Matter in Tidal Channels”, J. Geophysical Research (JGR), Vol. 112: C08010, doi: 10.1029/2005JC003423, 2007.

SUMMARY OF THE INVENTION

According to the teachings of the present invention, there is provided an exhaust pipe for a fuel burning engine including a hollow body, the body having an internal surface, an external surface, a first open end, a second open end and a longitudinal axis, wherein the internal surface is shaped to form standing cyclic wave geometry having at least 2 cycles.

When gas containing inhalable particles that enters the exhaust pipe through the first open end and flows out of the exhaust pipe through the second open end, a substantial amount of the inhalable particles are grouped to form filterable particles while flowing inside the exhaust pipe, whereby substantially increasing the quantity of filterable particles and substantially reducing the quantity of inhalable.

Typically, the longitudinal axis is disposed horizontally. But in variations of the present invention, the longitudinal axis is disposed vertically, wherein the second open end is elevated with respect to the first open end. In other variations of the present invention, the longitudinal axis is disposed diagonally, wherein the second open end is elevated with respect to the first open end.

Typically, the cross section of the exhaust pipe can be radial, polygonal, elliptical or other shapes.

The standing cyclic wave includes a narrow radial dimension $D_N$ and a wide radial dimension $D_W$, wherein the narrow radial dimension $D_N$ is substantially smaller than the wide radial dimension $D_W$. The ratio $D_W/D_N$ directly influences the grouping tendency of submicron particles.

The velocity field U inside the exhaust pipe is a standing wave velocity field, computed as follows:

$$U=U_a-U_b\cos(kx)(\sin(\omega t)+C),$$

where $U_a$ is the mean velocity, C is constant, $U_b$ is the amplitude, ω is the angular frequency of the wave:

$$\omega=\frac{2\pi}{T}$$

where T is said wave period, and k is said wave number:

$$k=\frac{2\pi}{L}$$

where L is said wave length, and wherein said constant C is selected to achieve the maximal and minimal velocity values at $D_W$ and $D_N$, respectively.

The normalized velocity field U* is:

$$U^*=U^*_a-U^*_b\cos(x^*)(\sin(t^*)+C),$$

where the velocities are normalized with a characteristic velocity: $U_c$, where $U_c=\omega/k$; x is normalized with k and t with ω, and wherein the asterisk denotes dimensionless parameters, and wherein substantial grouping occurs when:

$$\frac{(U_a^*-1)}{U_b^*}<1.$$

BRIEF DESCRIPTION OF THE DRAWINGS

The present invention will become fully understood from the detailed description given herein below and the accompanying drawings, which are given by way of illustration and example only and thus not limitative of the present invention, and wherein.

DESCRIPTION OF THE PREFERRED EMBODIMENTS

Figure 1:
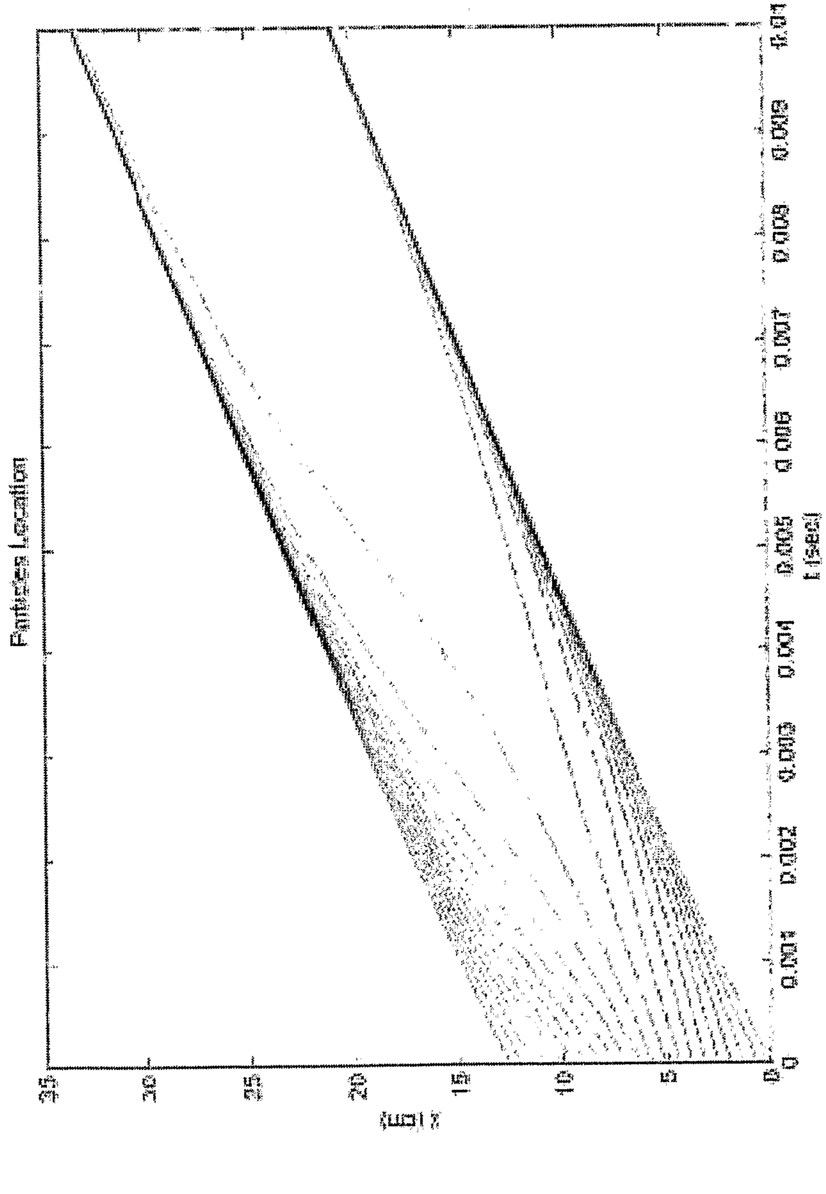
FIG. 1 is a graphical illustrates of an example of particle trajectories showing the formation of two groups.

Before explaining embodiments of the invention in detail, it is to be understood that the invention is not limited in its application to the details of construction and the arrangement of the components set forth in the host description or illustrated in the drawings. Unless otherwise defined, all technical and scientific terms used herein have the same meaning as commonly understood by one of ordinary skill in the art to which the invention belongs. The methods and examples provided herein are illustrative only and not intended to be limiting.

A principle intention of the present invention includes providing an exhaust-pipe for a fuel burning engine including a hollow body having an internal surface, an external surface, a first open end and a second open end. The internal surface is shaped to form a standing wave having at least 2 cycles. When gas containing inhalable particles enters the exhaust pipe through the first open end and flows out of the exhaust pipe through the second open end, a substantial amount of inhalable particles are grouped to form filterable particles, while flowing inside the exhaust pipe.

An aspect of the present invention is to provide a new concept of grouping in a pipe having a standing wave geometry, which defines a velocity standing wave. When a particle is moving in an oscillating gas-flow, the particle encounters areas where the velocity of the gas is faster or slower than the particle's own velocity. The time which takes for the particle to adjust to the local velocity change depends on the square of its diameter. Hence, some particles are affected more than others depending on the size of the particles. When a line of evenly distributed particles enters the pipe, a velocity wave is applied to the particles. Small delay time, that characterizes sub-micron particles, lead to the situation where a particle is accelerated or decelerated depending on the position of the particle in that wave (with respect to the local velocity level).

This brings to the separation between two particles which were moving one after the other, as one is accelerated relative to the other. The separation between neighboring particles forms groups. A graphical example is illustrated in FIG. 1, where particle trajectories are presented. At time=0 the particles are evenly distributed downstream on X, and as time passes, two groups are formed.

A standing velocity wave in a pipe is formed by periodically diameter variation downstream. According to the conservation of mass, in a smaller cross section higher velocity is obtained and vice versa. Hence, when the pipe diameter is converging and diverging periodically, a standing wave of velocity is obtained, wherein at any given time, the location of the maximum and minimum velocity values will be fixed along the pipe. Hence, in such a pipe, particles will experience acceleration and deceleration depending on their location.

Figure 2:
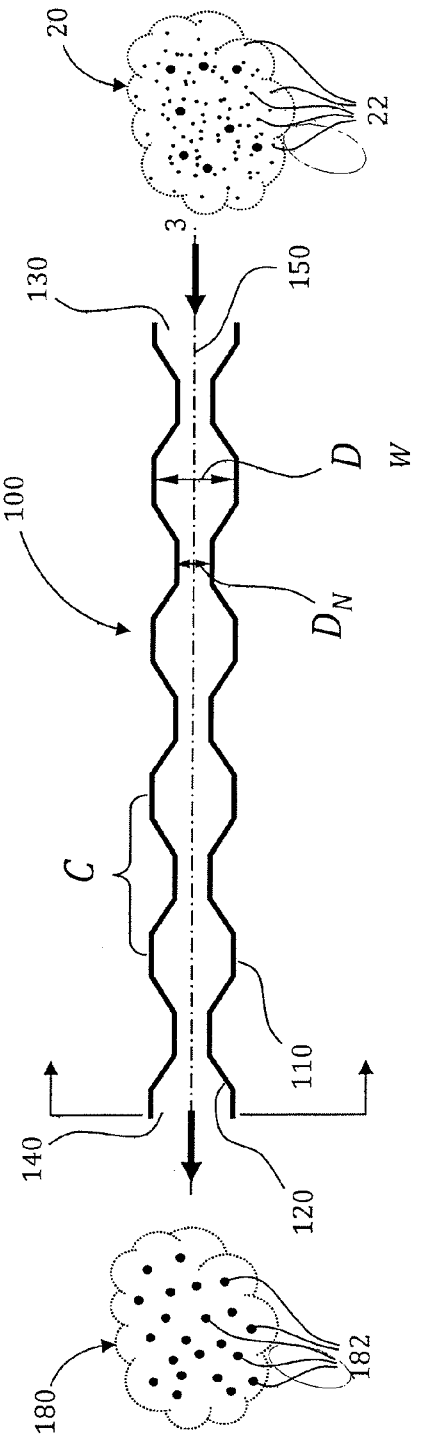
FIG. 2 is a cross section illustration of an exhaust-pipe, according to embodiments of the present invention; 3 indicate entrance of particles, 3 indicate entrance of particles.
Figure 4A:
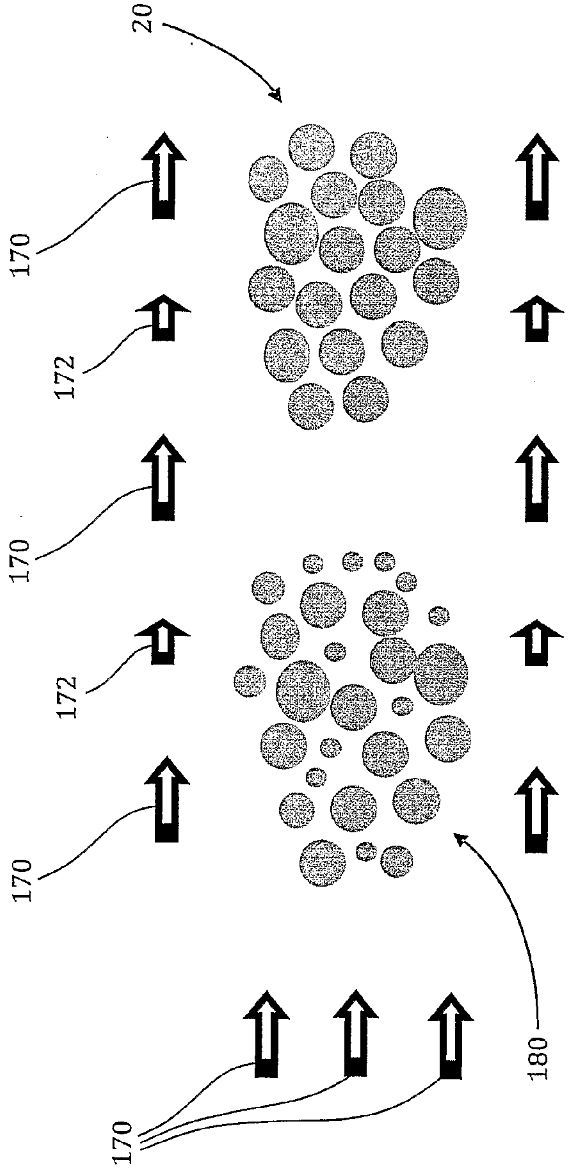
FIG. 4*a* graphically illustrates the grouping of particles as a result of flowing speed changes inside the exhaust-pipe shown in FIG. 2, 170 indicates higher velocity and 172 indicates lower velocity of particles, whereas 180 indicates the particles before grouping.
Figure 4B:
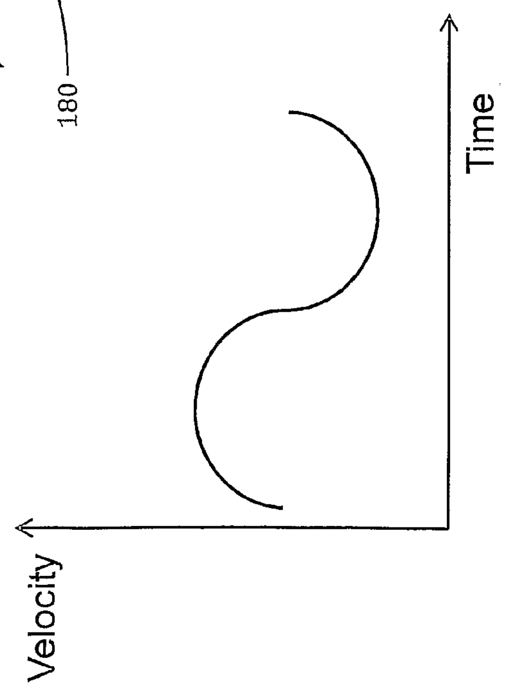
FIG. 4*b* graphically illustrates the sinusoidal change in the particles flow speed over time, while flowing inside the exhaust-pipe shown in FIG. 2.

Reference is now made to FIG. 2, which is a cross section illustration of an example exhaust-pipe 100, according to embodiments of the present invention. Exhaust-pipe 100 includes a hollow body having internal surface 120, external surface 110, a first open end 130 and a second open end 140. Internal surface 120 is shaped to form standing wave geometry having at least 2 cycles C. In the example shown in FIG. 1, exhaust-pipe 100 includes 5 cycles C. Reference is also made to FIG. 4*a*, which schematically illustrates the grouping of particles as a function of the particle's flowing speed changes inside exhaust-pipe 100, and to FIG. 4*b*, which graphically illustrates the sinusoidal change in the particles flow speed over time, while flowing inside exhaust-pipe 100. The values of flow velocity are indicated by the length of the arrows. The particles are introduced from the inlet within an oscillating gas-flow. The gas-flow has also a downstream periodic variation. As the particles travel downstream, grouping takes place and inhalable particles 22 vanish at the expense of size-increase of filterable particles 182.

When gas 20 containing inhalable particles 22 enters exhaust pipe 100 through first open end 130 and flows out of exhaust pipe 100 through second open end 140, a substantial amount of inhalable particles 22 are grouped to form filterable particles 182. It should be noted that some inhalable particles 22 are grouped with larger particles 182, which are filterable to begin with. For example, using exhaust pipe 100 for a vehicle engine, leads to clustering of inhalable particles 22 moving in pipe 100.

Figure 3B:
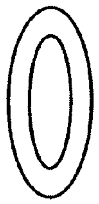
FIG. 3*b* shows an example of an elliptical cross section of the exhaust-pipe shown in FIG. 2.
Figure 3A:
FIG. 3*a* shows an example of a circular cross section of the exhaust-pipe shown in FIG. 2.

It should be noted that internal surface 120 is substantially symmetric with respect to longitudinal axis 150. Preferably, with no limitations on other shapes, exhaust pipe 100 has a circular cross section, as shown in FIG. 3*a*. FIG. 3*b* shows an example of an elliptical cross section of exhaust pipe 100. The narrow radial dimension $D_N$ of the cyclic wave is substantially smaller than the wide radial dimension $D_W$ of the wave, wherein the ratio $D_K/D_N$ directly influences the grouping tendency of submicron particles.

EXAMPLE

Figure 5:
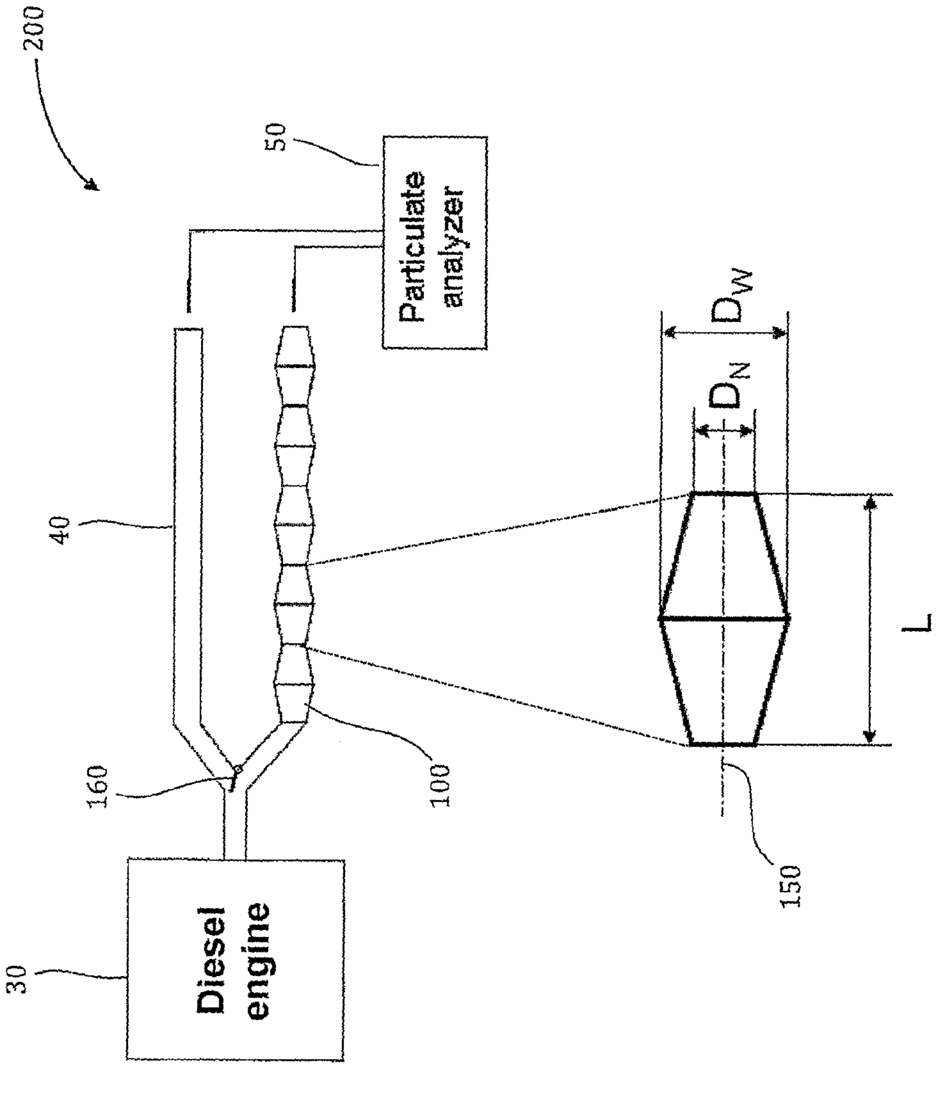
FIG. 5 schematically illustrates an experimental setup having the exhaust of a Diesel engine operatively attached, in parallel, to a straight conventional steel pipe and to a cyclic exhaust pipe, according to embodiments of the present invention, as well as an enlargement of one cycle of the cyclic exhaust pipe.

An experimental setup is shown in FIG. 5. The exhaust of a Diesel engine 30 is operatively attached, in parallel, to two exhaust pipes: a) straight conventional steel pipe 40, and b) exhaust pipe 100, having 6 cycles C. Both pipes 40 and 100 are 80 cm long and have the same flow rate. At the outlet of each pipe measurement apparatus 50 are used to measure the size distribution of the particles. A particulate analyzer 50 is used to detect and measure particles in the 300 nm to 2 μm diameter range. Pipe selector 160 is used to select the exhaust pipe being under test.

The experimental engine specifications are as follows:

| | |
|---|---|
| Engine model | Mitsubishi S3L engine |
| Engine type | Three-cylinder, 4-stroke, compression-ignited, air-cooled engine |
| Cylinder stroke/bore | stroke/bore 78.5/78 mm |
| Displacement volume | 1,125 $cm^3$ |
| Rated power: | 11.8 kW at 1,500 rev/min |

In each test, the engine was operated under a set of operation conditions (engine speed and engine load). The engine was run under the specified conditions to attain steady-state operation, and then the exhaust gas was sampled first from the regular pipe and subsequently from the resonating pipe. Each sample was averaged during a time interval of 30 seconds.

Figure 6:
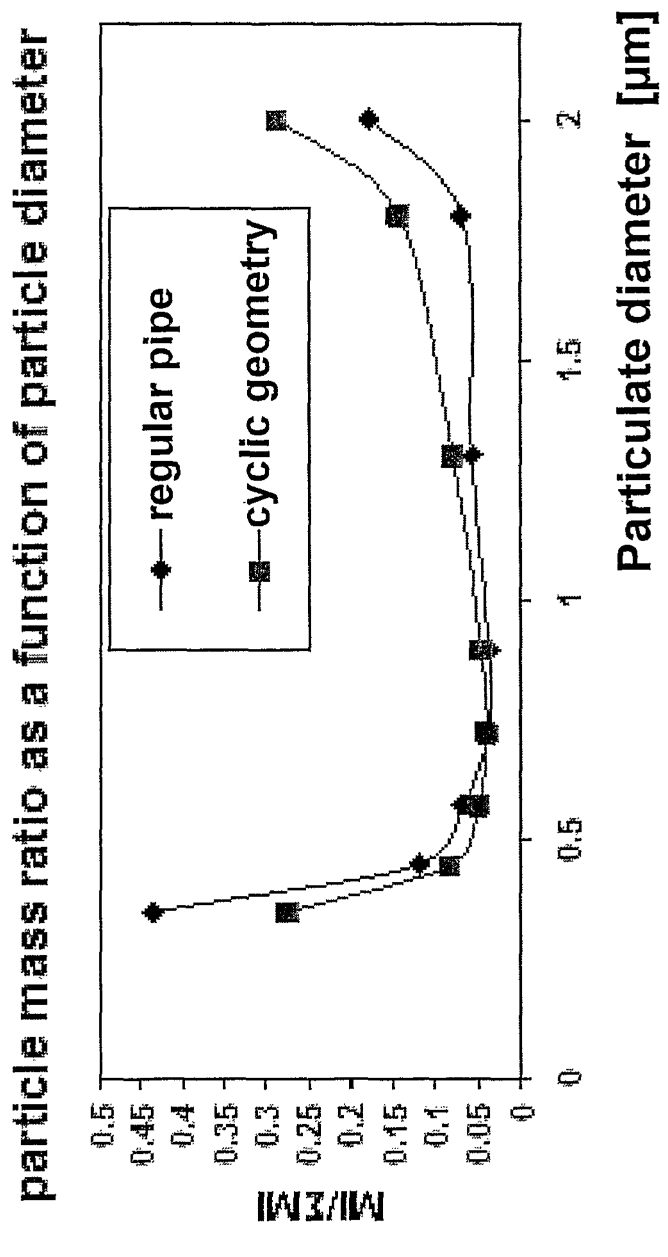
FIG. 6 graphically illustrates the decrease of the amount inhaleable particles flowing out of the exhaust pipe, shown in FIG. 5, compared with the inhalable particles flowing out of conventional straight pipe.

The results show a considerable decrease of the amount of the smaller particles at the expense of larger mass in the larger particle size-section. FIG. 6 graphically illustrates the decrease of the amount inhalable particles flowing out of exhaust pipe 100 compared with the inhalable particles flowing out of straight pipe 40.

Figure 7:
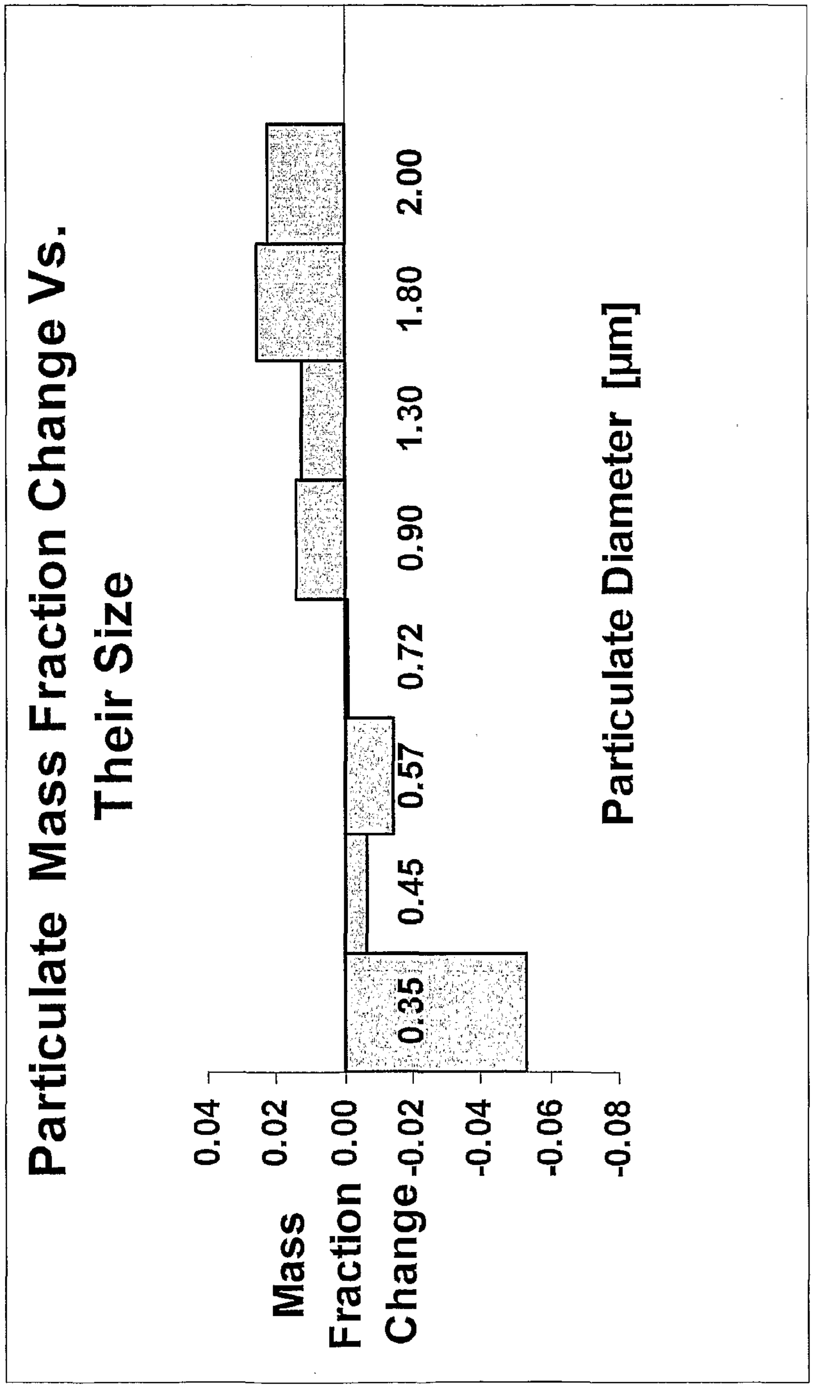
FIG. 7 graphically illustrates the effect of a cyclic exhaust pipe, according to embodiments of the present invention, on the particulates' size distribution.

The effect of exhaust pipe 100 is clearly demonstrated in FIG. 7, which is a graphically illustration of the effect of cyclic exhaust pipe 100, according to embodiments of the present invention, on the particulates' size distribution. The example setup is as follows: engine speed=1,700 rpm, engine load=0 kW, exhaust pipe 100 aspect ratio, $D_W/D_N$=2.27, length to diameter ratio, L/D=2.0. FIG. 7 shows how the size distribution of the exhaust particles is affected. The mass fraction change Δmass fraction is defined as follows:

$$\Delta\text{mass\_fraction}=M_{modified}-M_{reg},$$

Where $M_{modified}$ is the mass of larger particles 182, measured at the exhaust of cyclic exhaust pipe 100, and $M_{reg}$ is the particles mass measured at the exhaust of regular pipe 40.

The apparent mass fraction of small particles 22 (in particular, in the sub-micron regime) has been reduced by some 2-6%, whilst the mass fraction of larger particles 182 was increased by some 1-2%. While particles 22 smaller than 0.3 μm are not detectable by the particulate size analyzer used, mass conservation suggests that the remarkable increase in the mass fraction of the larger-size particles 182, may confidently be attributed to the grouping (leading to agglomeration) of the undetected smaller-size particles 22. Similar encouraging results were observed in a wide range of engine loads (FIG. 8) and engine speeds (FIG. 9).

Figure 8:
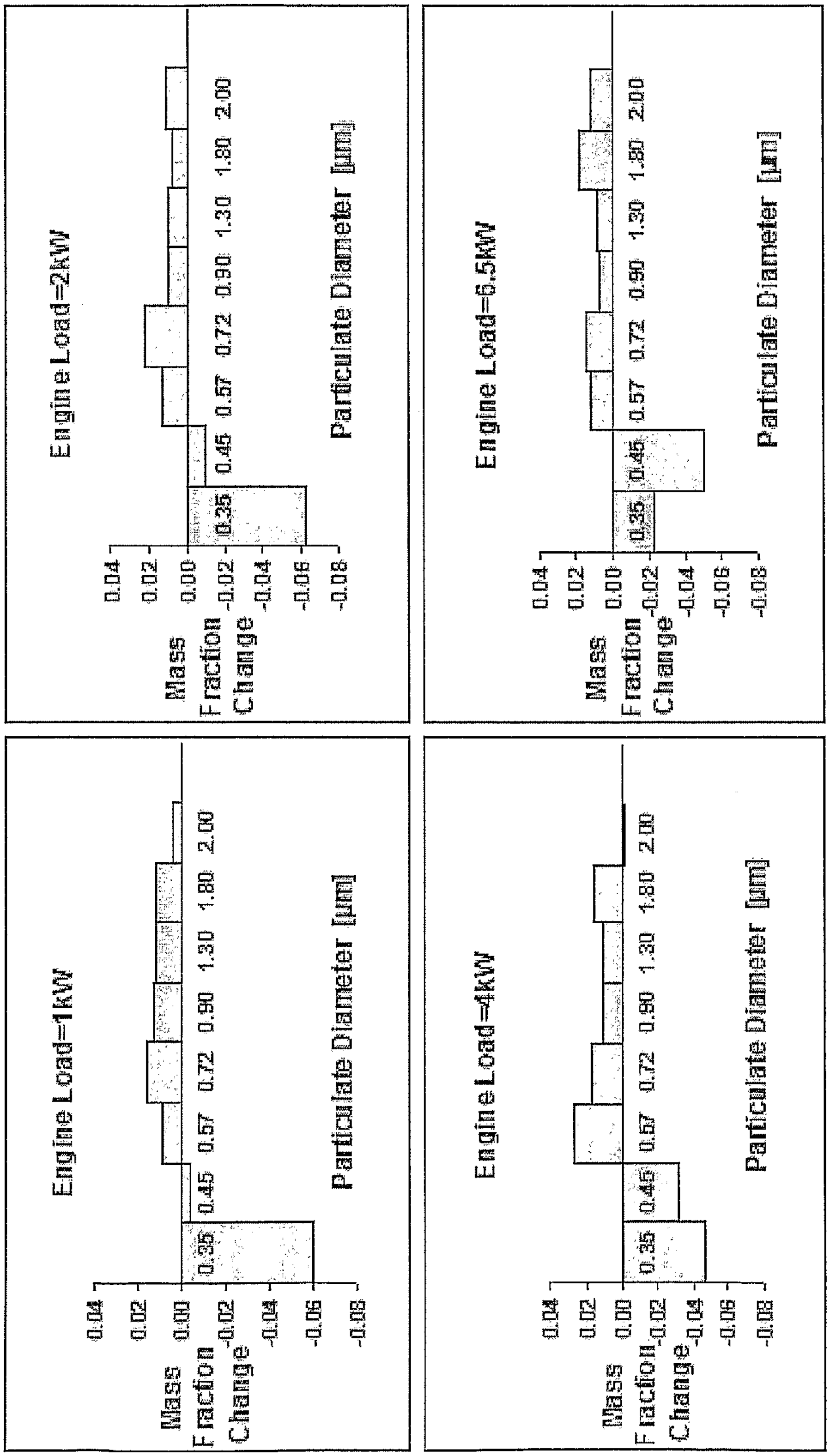
FIG. 8 graphically illustrates the effect of the engine's load on the particulates' size distribution.

The effect of the engine load at 1,700 rpm is depicted in FIG. 8, which is a graphically illustration of the effect of the engine's load on the particulates' size distribution. Although, when the engine load increases, the total number of particles in any particle-size category increases as well, the effect of the alternating diameter pipe is fairly comparable.

Figure 9:
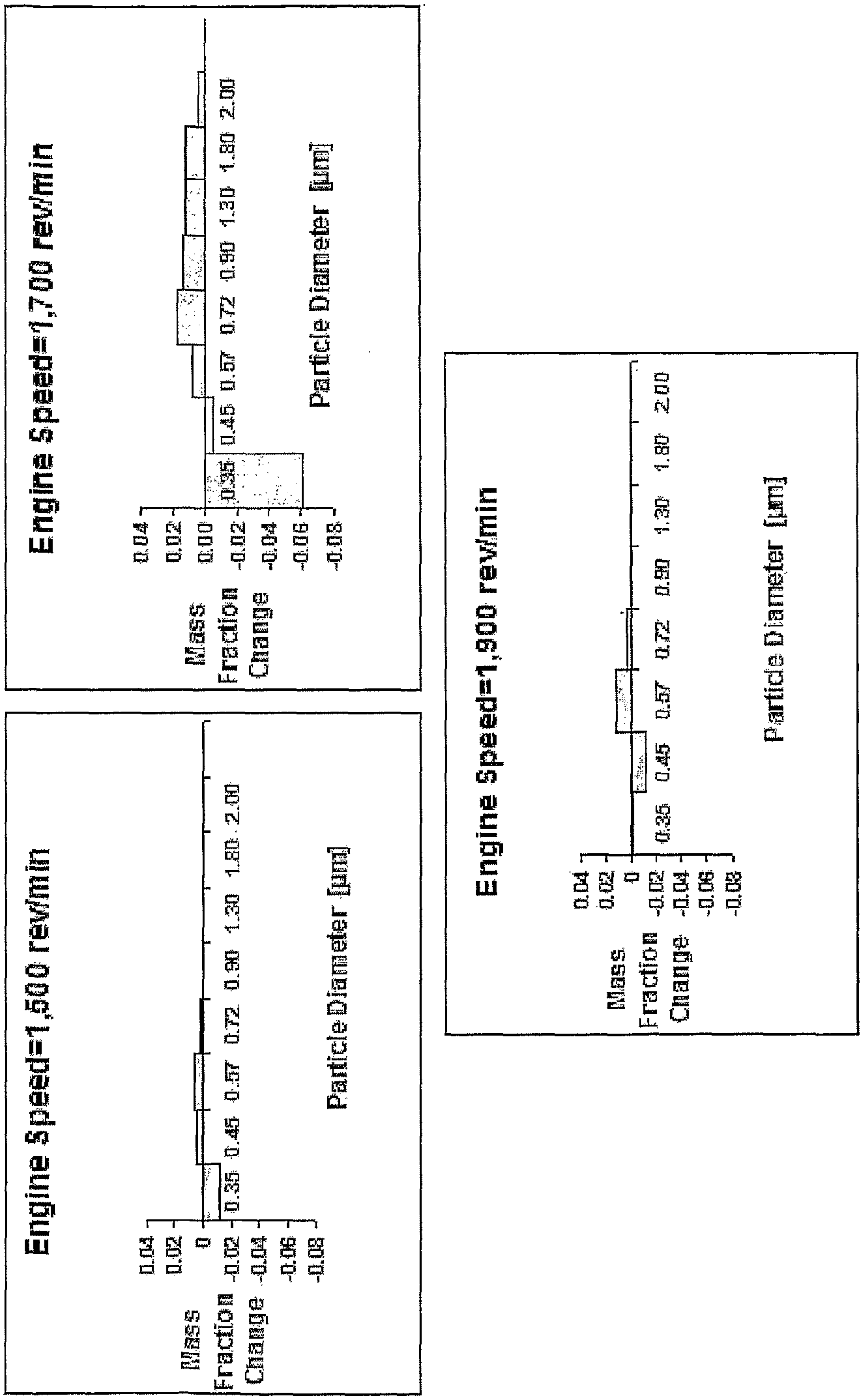
FIG. 9 graphically illustrates the effect of the engine's speed on the particulates' size distribution.

FIG. 9 shows the effect of the engine speed on the mass fraction change at an engine load of 2 kW. The results for the 1,500 rpm and 1,700 rpm are quite similar to those shown earlier. The results for the 1,900 rpm still show the migration of inhalable particles 22 towards larger-size particle 182, but the effect is rather mild. It should be noted that the total amount of the particles is low due to the low engine load, while the residence time of the particles in the exhaust pipe is relatively short due to the high exhaust gas velocity.

Mathematical Analysis of Grouping in a Converging Pipe (Standing Wave Velocity Field)

The converging pipe geometry induces particle grouping and coagulation leading to a shift in particle size distribution, which increases the mass/number of the larger particles at the expense of the reduction in the amount of smaller particles.

The velocity field U inside pipe 100 is a standing wave velocity field with modification:

$$U=U_a-U_b\cos(kx)(\sin(\omega t)+C), \tag{1}$$

where $U_a$ is the mean velocity, C is constant, $U_b$ is the amplitude, ω is the angular frequency of the wave $$\left(\omega=\frac{2\pi}{T}\right.$$

where T is the wave period) and k is the wave number $$\left(k=\frac{2\pi}{L}\right.$$

where L is the wave length).

The constant C is introduced in order to achieve the maximal and minimal velocity values at the areas of biggest and smallest diameter, correspondingly, and C>1 to fulfill that condition.

The equation of particle motion in a dimensional form is:

$$\ddot{x}=\frac{1}{\tau_p(U-\dot{x})} \tag{2}$$

where x is the particle location and $$\tau_p=\frac{1}{18}\frac{\rho_p D_p^2}{\mu}$$

(Katoshevski, D., Dodin, Z., Ziskind, G., 2005, "Aerosol clustering in oscillating flows: mathematical analysis", Atomization and Sprays 15, 401-412), $\rho_p$ is the particle density, $D_p$ is the particle diameter, and μ is the dynamic viscosity of the host gas.

Substituting the velocity field (Eq. 1) into the particle equation of motion (Eq. 2) leads to the following dimensional equation:

$$\ddot{x} + \frac{1}{\tau_p}\dot{x} + \frac{U_b}{\tau_p}\cos(kx)(\sin(\omega t) + C) = \frac{U_a}{\tau_p}, \quad (3)$$

The normalized velocity field is:

$$U^* = U^*_a - U^*_b \cos(x^*)(\sin(t^*) + C), \quad (4)$$

where the velocities are normalized with a characteristic velocity: $U_c$, where $U_c = \omega/k$. x is normalized with k and t with $\omega$ (the asterisk denotes dimensionless parameters).

The equation of particle motion in dimensionless form is:

$$\ddot{x}^* = \frac{1}{St}(U^* - \dot{x}^*) \quad (5)$$

where x* is the particle location and $$St = \frac{1}{18}\frac{\rho_p \omega D_p^2}{\mu}$$

is the Stokes number.

Inserting the dimensionless velocity field into the particle equation of motion leads to the following equation:

$$\ddot{x}^* + \frac{1}{St}\dot{x}^* + \frac{U_b^*}{St}\cos(x^*)(\sin(t^*) + C) = \frac{U_a^*}{St}, \quad (6)$$

Introducing:

$$\theta = x^* - t^*$$

leads to:

$$\ddot{\theta} + \frac{1}{St}\dot{\theta} + \frac{U_b^*}{St}\cos(\theta + t^*)(\sin(t^*) + C) = \frac{U_a^* - 1}{St} \quad (7)$$

Introducing:

$$t^* = \frac{\tau}{\sqrt{U_b^*/St}}$$

leads to:

$$\ddot{\theta} + \dot{\theta} + \alpha \cos(\theta + t^*)[\sin(t^*) + C] = \beta, \quad (8)$$

where $$\alpha = \frac{1}{\sqrt{StU_b^*}} \quad (9)$$

and $$\beta = \frac{(U_a^* - 1)}{U_b^*}. \quad (10)$$

In order to ensure grouping we need to maintain β<1.

There are basically two modes of grouping, where one is denoted as "stable grouping" and the other is denoted as "non-stable grouping". In the stable mode, particles are forming groups that do not brake further downstream. In the non-stable mode, groups may breakup and some of the particles do not group at all. In order to ensure a high degree of grouping or stable grouping, the condition of β<1 has to be substantially fulfilled. Smaller particles (typically smaller than 80μ but larger than a molecule), having a diameter close to zero, have a higher tendency to group, that is smaller Stokes number. However, to ensure grouping the condition β<1 should be fulfilled, although grouping in the standing wave configuration may occur also at β<1.

Figure 10:
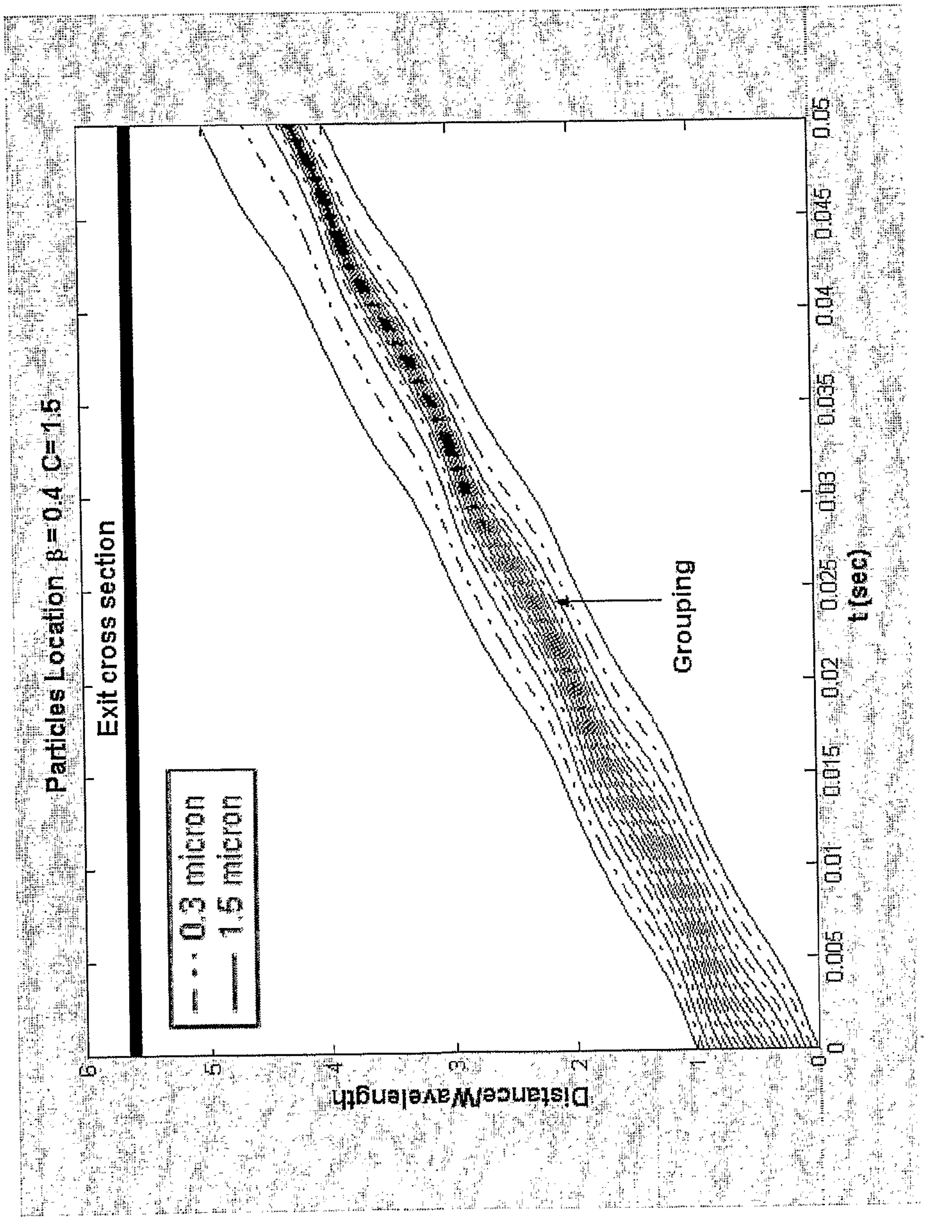
FIGS. 10-12 are graphically illustrations of particles trajectories. Particle's grouping is well observed for $\beta<1$: as $\beta$ increases, the grouping tendency is weakened.
Figure 11:
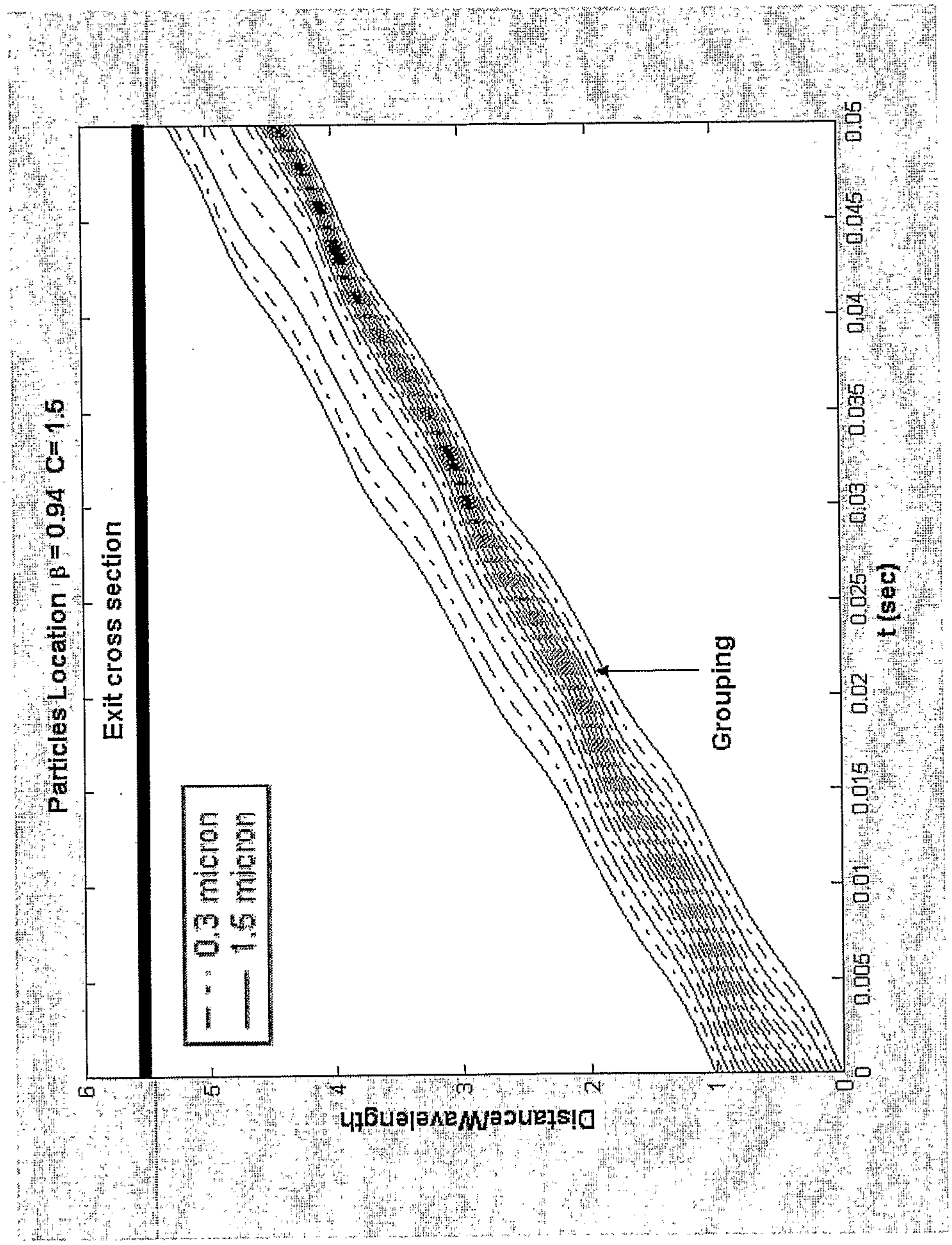
Figure 12:
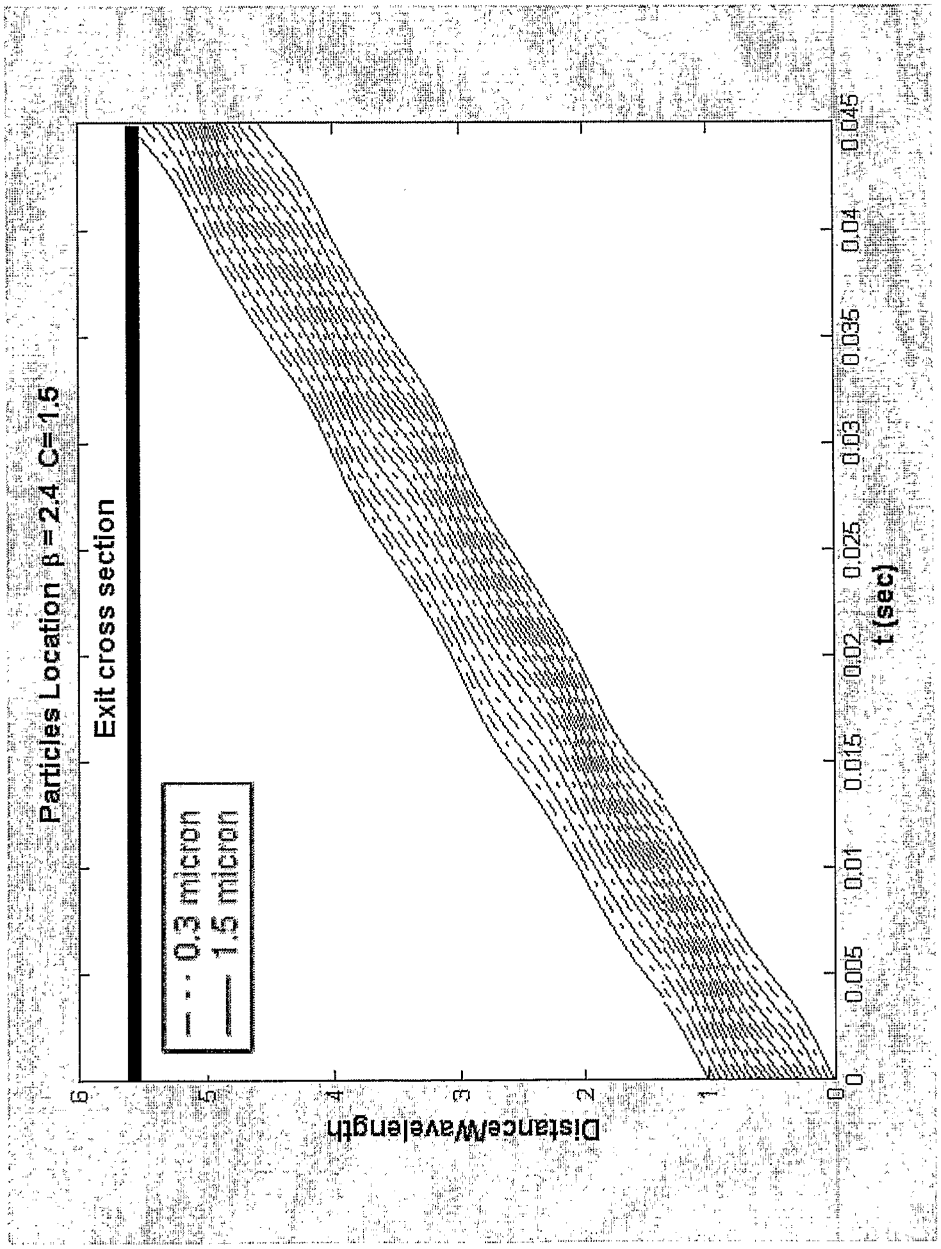

FIGS. 10-12 demonstrates calculations for particle trajectories as measured on example system 200 shown in FIG. 5. Three sets of calculations are made with the same value of C (C=1.5) but with different β values (β=0.4, 0.94, 2.4). Particle diameters are set to 0.3 μm and 1.5 μm, sizes which are relevant to the experimental results described in FIGS. 10-12. Particles groups after approximately 2 cycles are shown in FIGS. 10-12. Grouping is denoted by the dense area of FIG. 10 where the trajectories of the particles come closer together. As β is increased from 0.4 to 0.94 the tendency for grouping is decreased as shown in FIG. 11 (the lines are less dense) and for a larger value of β, 2.4, as shown in FIG. 12, the situation may be denoted as weak grouping or non-grouping. This coincides with the results mentioned earlier, obtained for the moving wave scenario, that is, β should be less than unity to ensure a significant degree of grouping. It is important to note that the model does not include a "sticking" factor, and, as soot particles do have some stickiness characteristics, practically, a significant coagulation takes place after 2 wave lengths and continue downstream exhaust-pipe 100, having standing wave geometry.

Following the above condition as a design tool for converging pipe 100, β is defined with the following parameters of converging pipe 100:

| | |
|---|---|
| $A_{max}$ | Maximum area of the pipe |
| $A_{min}$ | Minimum area of the pipe |
| f | Frequency of pulsating flow at inlet |
| L | Distance between two nodes |
| N | Engine speed in rev/min |
| n | Number of cylinders |
| Q | Volumetric flow rate |
| R | Area ratio ($A_{max}/A_{min}$) |
| $V_d$ | Cylinder displacement volume (for one cylinder) |
| x | Engine revolutions per working stroke (=2 for 4 stroke engine) |

Let us define, for convenience, T=sin(ωt)+C. Applying mass conservation between maximum and minimum locations and assuming that the density of the gas is constant.

$$\frac{U_a + U_b T}{U_a - U_b T} = \frac{A\max}{A\min} \quad (11)$$

Inserting to β and using dimensional expressions:

$$\beta = \frac{U_a - \frac{\omega}{k}}{U_b} = 2\frac{U_a - \frac{\omega}{k}}{\frac{U_a}{T}\frac{(A\max - A\min)}{(A\min + A\max)}} \quad (12)$$

Using the relations:

$$Q = \frac{N \cdot n}{60 \cdot x}V_d, \quad f = \frac{N \cdot n}{60 \cdot x}$$

we can write:

$$\frac{\omega}{k} = fL = \frac{Q}{V_d} L \quad (13)$$

Inserting that to β:

$$\beta = T\left(1 - 2\frac{(V^* - 1)}{(R - 1)}\right) \quad (14)$$

where T is a function of time, and in order to evaluate its value we should relate time to the grouping occurrence. This is enabled by using the mathematical model as reflected in FIGS. 10-12.

Figure 13:
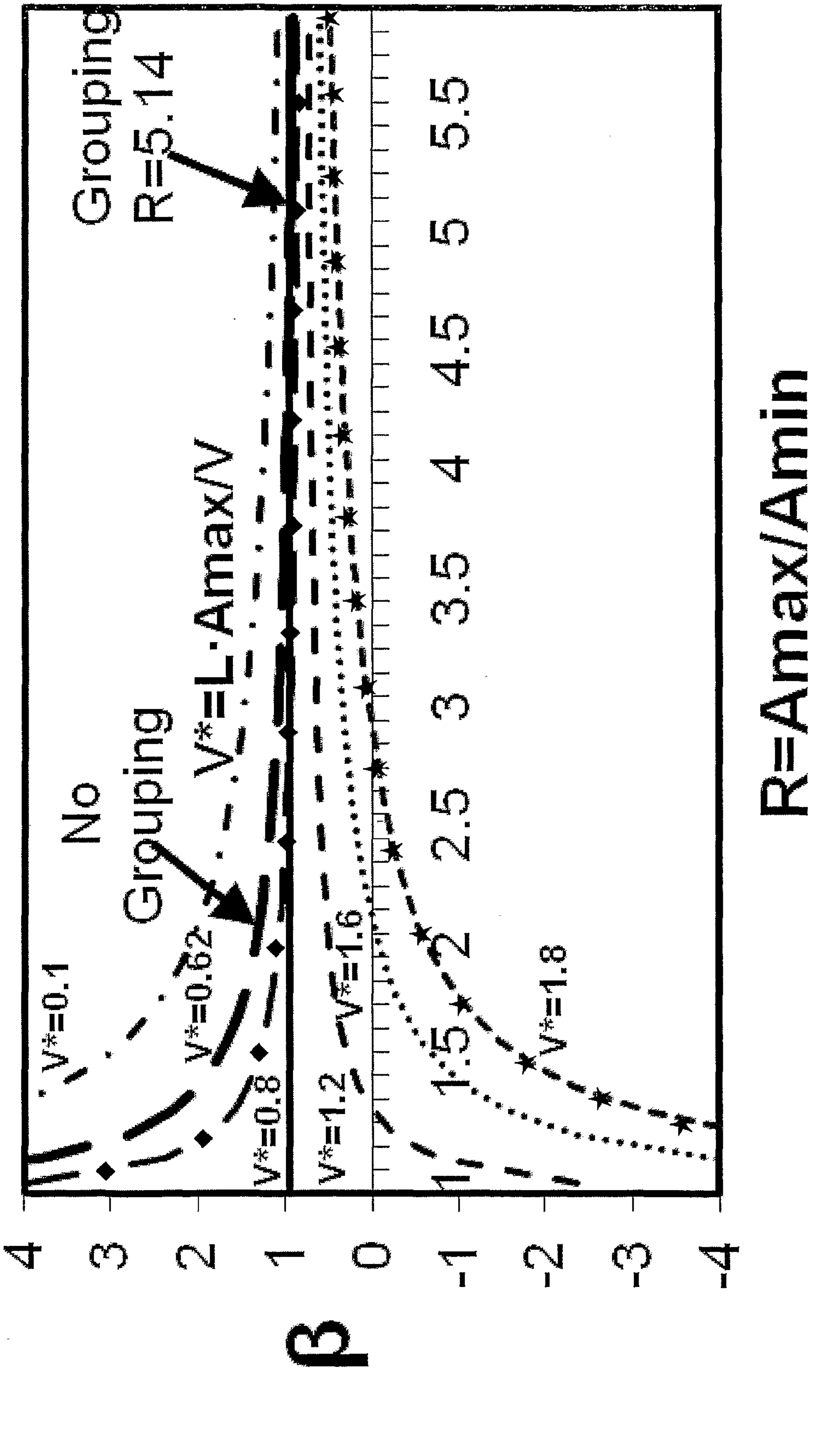
FIG. 13 graphically illustrates an approximated benchmark sketch for designing a converging pipe design, according to the present invention.

The characteristic grouping time is related to the value of β, which facilitates a practical design tool of the exhaust pipe, as described in FIG. 13, which is a benchmark sketch for design. That sketch enables to evaluate the pipe-geometry as a function of engine characteristics. For optimal performance it is suggested that $0<\beta<1$. For example, the value of the volume ratio V* for the example system 200, shown in FIG. 5, is 0.62, and the cross section area relation is R=5.14. For the case of β=0.94, described in FIG. 11, the corresponding value of the function T (Eq. 14) leads to the time value of 0.025 sec. This in turn corresponds well to the grouping occurrence as reflected in FIG. 11. Hence, fixing the correct position of the curve for V*=0.62 in that sketch.

Figure 14:
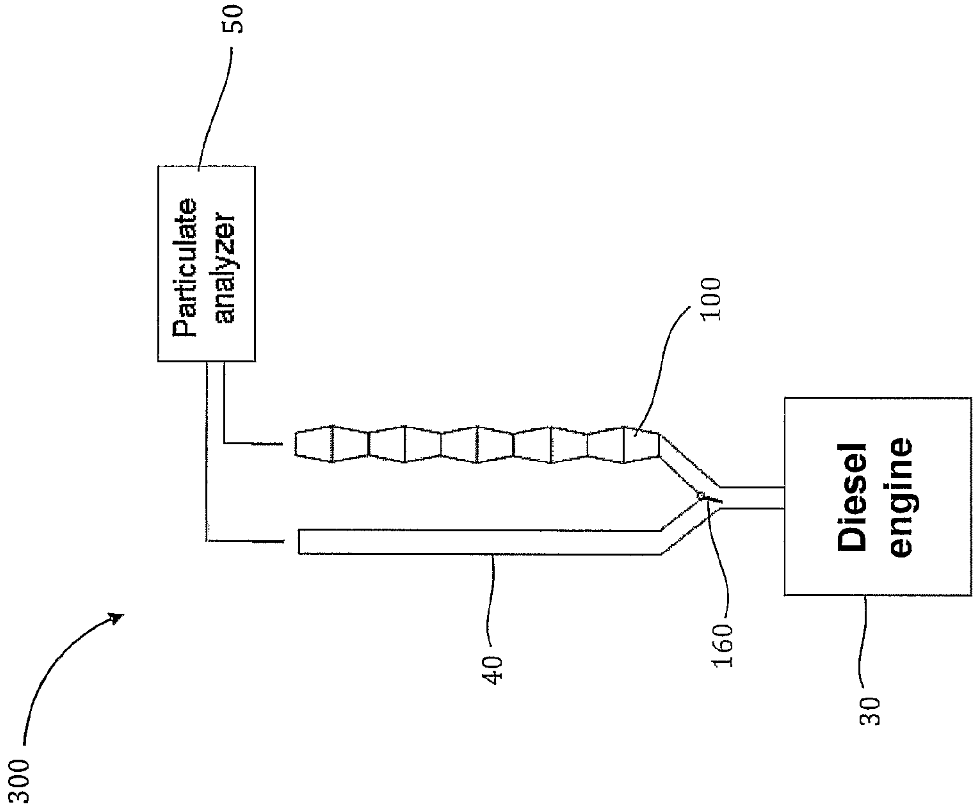
FIG. 14 schematically illustrates an experimental setup having the exhaust of a Diesel engine operatively attached, in parallel, to a straight conventional steel pipe and to a cyclic exhaust pipe, according to preferred variations of the present invention, whereas the cyclic exhaust pipe is disposed in vertical direction.

In preferred variations of the present invention, exhaust pipe 100 is operatively disposed vertically, whereas the internal flow of gas is generally upwardly. Reference is made to FIG. 14, which schematically illustrates an experimental setup 300 having the exhaust of a Diesel engine 30 operatively attached, in parallel, to a straight conventional steel pipe 40 and to a cyclic exhaust pipe 100, according to preferred variations of the present invention, whereas cyclic exhaust pipe 100 is disposed in vertical direction. Both pipes 40 and 100 are 80 cm long and have the same flow rate. At the outlet of each pipe measurement apparatus 50 are used to measure the size distribution of the particles. Hence, disposing cyclic exhaust pipe 100 is disposed in vertical direction, wherein a first open end 130 is pointing upwardly.

The results show a considerable decrease of the amount of the smaller particles at the expense of larger mass in the larger particle size-section, compared with setup of system 200, shown in FIG. 5, operated under substantially the same conditions.

Figure 15:
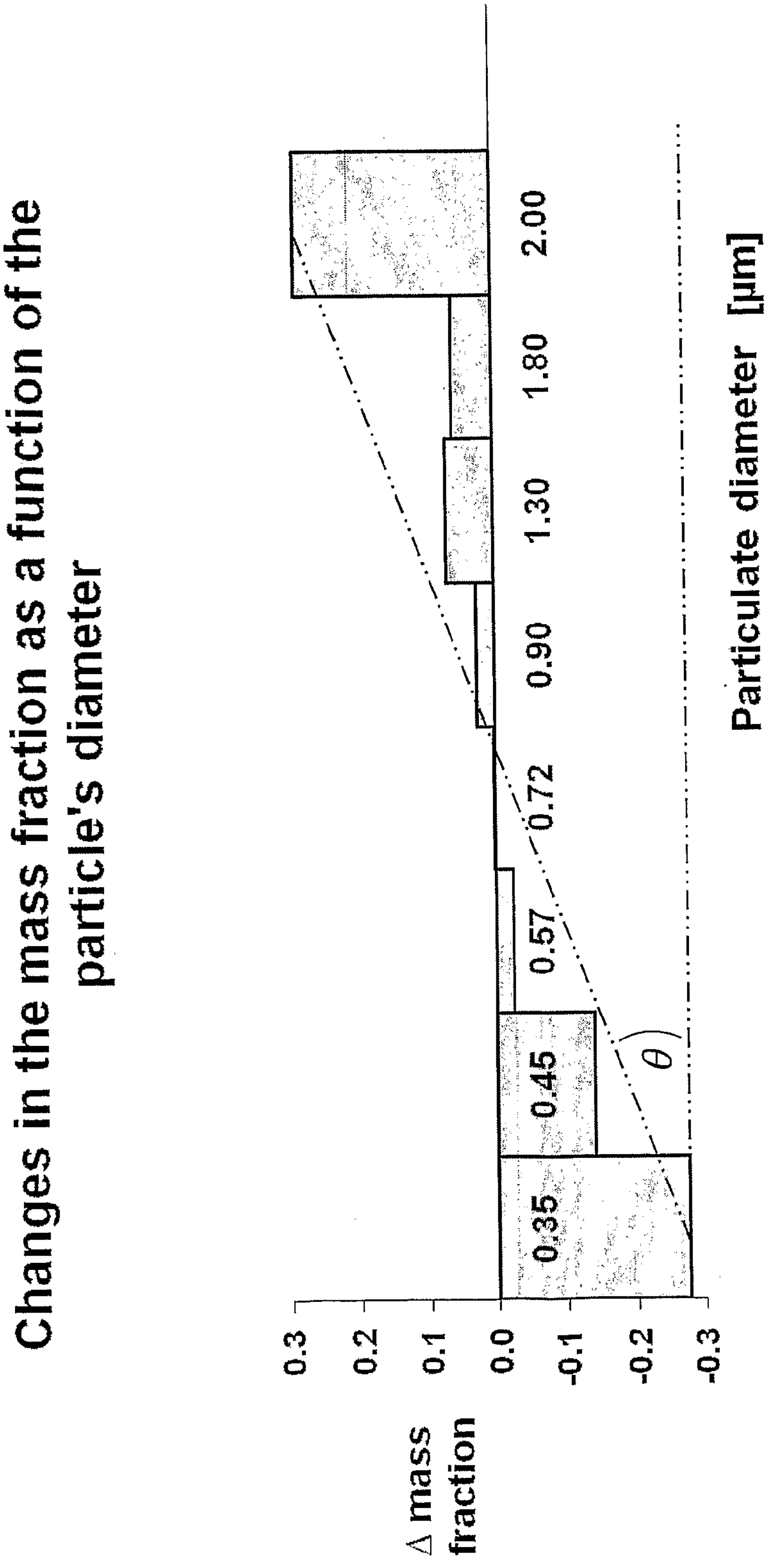
FIG. 15 graphically illustrates an example showing the changes in the mass fraction as a function of the particle's diameter while flowing inside the exhaust-pipe shown in FIG. 14.
Figure 16:
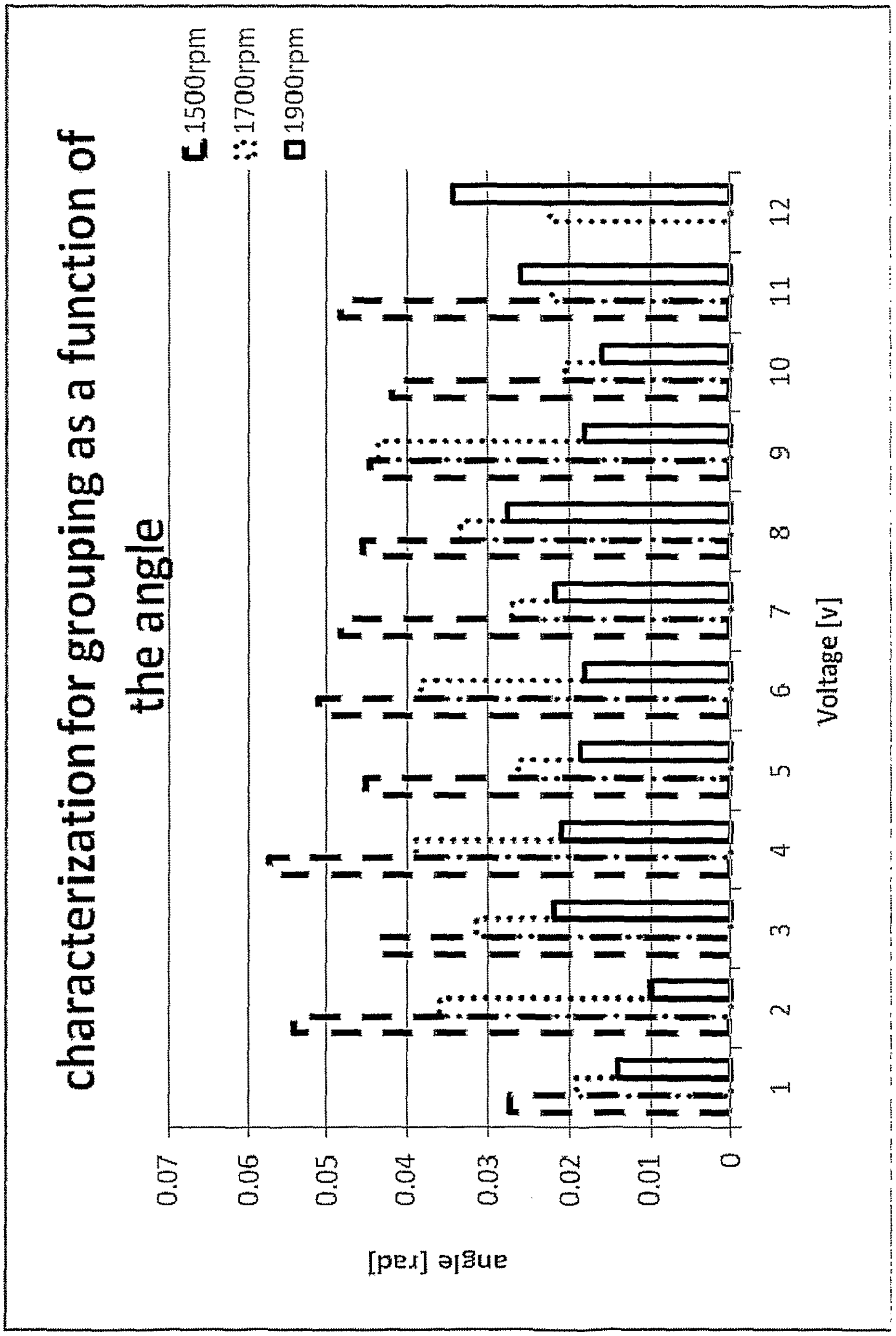
FIG. 16 graphically illustrates an example case to show the characterization of grouping as a function of the EXHAUST angle.

FIG. 15 graphically illustrates an example showing the changes in the mass fraction as a function of the particle's diameter while flowing inside the exhaust-pipe 100 being part of system 300, wherein the engine operates at 1500 rpm and with a 6 kW load. It should be noted that the grouping rate can by characterized by the slope denoted by angle θ. The larger angle θ is, the higher the grouping rate is. FIG. 16 graphically illustrates an example case to show the characterization of grouping as a function of angle θ, at various engine speeds.

In other variations of the present invention, exhaust pipe 100 is operatively disposed diagonally, whereas the internal flow of gas is generally upwardly.

It should be noted that the resistance pressure inside a conventional exhaust pipe 40 and compatible exhaust pipe 100 are substantially the same.

The invention being thus described in terms of embodiments and examples, it will be obvious that the same may be varied in many ways.

What is claimed is:

1. An exhaust pipe for a fuel burning engine comprising a hollow body, said body having an internal surface, an external surface, a first open end, a second open end and a longitudinal axis, said hollow body forming an exhaust flow conduit between the first open end and the second open end;

the first open end having a first cross-sectional area perpendicular to the direction of a received exhaust flow therethrough;

the conduit having a cross-sectional area that varies along at least a portion of the longitudinal length of the conduit;

wherein the cross-sectional area throughout the at least a portion of the longitudinal length is equal to or greater than the first cross-sectional area;

wherein said internal surface is shaped to form a standing cyclic wave geometry having at least two cycles;

wherein gas containing inhalable particles that enters the exhaust pipe through said first open end and flows out of the exhaust pipe through said second open end;

wherein an amount of said inhalable particles are grouped to form filterable particles while flowing inside the exhaust pipe;

wherein a velocity at all times and locations designated by a function U is:

$$U=U_a-U_b\cos(kx)(\sin(\omega t)+C),$$

where $U_a$ is an average velocity, C is constant, $U_b$ is a velocity amplitude, ω is an angular velocity of the wave: ω=2π/T wherein T is a time to complete one wave cycle, or ω=2πf where f is the oscillating frequency of the inlet oscillations, k is a wave number: k=2π/L wherein L is said wave length; and wherein said constant C is selected to achieve a maximal velocity at a narrow radial dimension $D_N$ of said standing cyclic wave and a minimal velocity at a wide radial dimension $D_W$ of said standing cyclic wave.

2. The exhaust pipe of claim 1, wherein said longitudinal axis is disposed horizontally.

3. The exhaust pipe of claim 1, wherein said longitudinal axis is disposed vertically, wherein said second open end is elevated with respect to said first open end.

4. The exhaust pipe of claim 1, wherein said longitudinal axis is disposed diagonally, wherein said second open end is elevated with respect to said first open end.

5. The exhaust pipe of claim 1, wherein said narrow radial dimension $D_N$ is smaller than said wide radial dimension $D_W$.

6. The exhaust pipe of claim 5, wherein a ratio $D_W/D_N$, which is larger than 1, directly influences the grouping tendency of submicron particles.

7. The exhaust pipe of claim 1, wherein a shape of a cross section of the exhaust pipe has a form that is one of radial, polygonal, elliptical and other shapes.

8. The exhaust pipe of claim 1, wherein a non-dimensional velocity field U* is, wherein an asterisk '*' designates a non-dimensional value:

$$U^*=U^*_a-U^*_b\cos(x^*)(\sin(t^*)+C),$$

wherein $U_a$ and $U_b$ are normalized with a characteristic velocity: $U_c$, wherein $U_c=\omega/k$; x is normalized with k and t with ω; and wherein grouping occurs when: $(U^*_a-1)/U^*_b<1$.

9. The exhaust pipe of claim 8, wherein the dimensional form of the ratio $(U_a-fL)/U_b<1$, the term fL shows that the grouping is a function of both the inlet frequency and the length of the pipe sections and/or modules.

10. The exhaust pipe of claim 1, wherein the hollow body is free of exhaust flow inhibiting interior structures.

11. The exhaust pipe of claim 1, wherein the filterable particles are grouped without an additionally added fluid.

12. An exhaust component for enhancing generation of filterable particles from engine exhaust, the exhaust component comprising:

an exhaust component inlet coupleable to an exhaust outlet of a combustion engine, the combustion engine in operation producing an engine exhaust having at least one exhaust flow characteristic, the exhaust component inlet having an outer wall and an opening therethrough, the opening having a first cross-sectional area perpendicular to the direction of a received exhaust flow therethrough;

a flow cycling section communicably coupled to the exhaust component inlet, the flow cycling section including:

a plurality of sub-sections, each of the plurality of subsections having an outer sub-section wall forming an exhaust flow conduit between a subsection inlet and a subsection outlet, the conduit varying in cross-sectional area along at least a portion of conduit, wherein the cross-sectional area is equal to or greater than the first cross-sectional area at the subsection inlet and at the subsection outlet, and wherein the cross-sectional area of the conduit increases along the conduit length from the inlet to maximum area, and decreases from the maximum area to the subsection outlet;

wherein the plurality of sub-sections in the flow cycling section each have a length and variation in the cross-sectional area configured for the at least one exhaust flow characteristic of the combustion engine, such that cyclic flow occurs within the plurality of subsections, the cyclic flow inducing particle grouping and coagulation; and wherein a velocity at all times and locations designated by a function U is:

$$U=U_a-U_b\cos(kx)(\sin(\omega t)+C),$$

where $U_a$ is an average velocity, C is constant, $U_b$ is a velocity amplitude, ω is an angular velocity of the wave: ω=2π/T wherein T is a time to complete one wave cycle, or ω=2πf where f is the oscillating frequency of the inlet oscillations, k is a wave number: k=2π/L wherein L is said wave length; and wherein said constant C is selected to achieve a maximal velocity at a narrow radial dimension $D_N$ of said standing cyclic wave and a minimal velocity at a wide radial dimension $D_W$ of said standing cyclic wave.

13. The exhaust component of claim 12, further comprising:

an exhaust component outlet coupled to the flow cycling section, the exhaust component outlet having an outer wall and an opening therethrough.

14. The exhaust component of claim 12, wherein the induced particle grouping and coagulation produces particles of a filterable size.

15. The exhaust component of claim 12, wherein the flow cycling section is free of restrictions producing resistance pressure on the received exhaust flow greater than pressure on the received exhaust flow for a conventional exhaust pipe.

16. The exhaust component of claim 12, wherein the at least one exhaust flow characteristic of the engine exhaust includes a cyclic exhaust flow.

17. The exhaust component of claim 12, wherein the plurality of sub-sections in the flow cycling section each have a length and variation in the cross-sectional area that is configured to produce a standing wave in the exhaust flow.

18. The exhaust component of claim 12, wherein the plurality of exhaust flow conduits are free of exhaust flow inhibiting interior structures.

19. The exhaust component of claim 12, wherein the filterable particles are grouped without an additionally added fluid.

20. An exhaust pipe for use with an internal combustion engine, the exhaust pipe comprising:

a flow cycling section having a plurality of sub-sections, each of the plurality of subsections including:

a subsection inlet having an outer wall and an opening therethrough;

an outer sub-section wall forming a conduit coextensive with the subsection inlet, the conduit having a length and varying in cross-sectional area along at least a portion of the conduit length, wherein the varying cross-sectional area along the conduit length increases between the subsection inlet to a maximum, and decreases from the maximum; and a subsection outlet coextensive with conduit at a point along the length of the conduit beyond the maximum;

wherein the plurality of sub-sections in the flow cycling section each have a length and variation in the cross-sectional area along the length that is configured for at least one flow characteristic of an exhaust flow from an attached combustion engine, such that cyclic flow occurs within the plurality of subsections, the cyclic flow inducing filterable size particle grouping and coagulation in the exhaust flow; and wherein a velocity at all times and locations designated by a function U is:

$$U=U_a-U_b\cos(kx)(\sin(\omega t)+C),$$

where $U_a$ is an average velocity, C is constant, $U_b$ is a velocity amplitude, ω is an angular velocity of the wave: ω=2π/T wherein T is a time to complete one wave cycle, or ω=2πf where f is the oscillating frequency of the inlet oscillations, k is a wave number: k=2π/L wherein L is said wave length; and wherein said constant C is selected to achieve a maximal velocity at a narrow radial dimension $D_N$ of said standing cyclic wave and a minimal velocity at a wide radial dimension $D_W$ of said standing cyclic wave.

21. The exhaust pipe of claim 20, wherein the conduit is free of exhaust flow inhibiting interior structures.

22. The exhaust pipe of claim 20, wherein the filterable size particles are grouped without an additionally added fluid.

* * * * *